United States Patent
Kennedy et al.

(10) Patent No.: US 7,775,596 B2
(45) Date of Patent: Aug. 17, 2010

(54) SMARTFOLD ELECTRONIC ACTUATION

(75) Inventors: Karl R. Kennedy, Fraser, MI (US);
John F. Nathan, White Lake, MI (US);
Samuel R. Hanlon, Livonia, MI (US);
H. Winston Maue, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 79 days.

(21) Appl. No.: 11/566,429

(22) Filed: Dec. 4, 2006

(65) Prior Publication Data
US 2008/0129098 A1 Jun. 5, 2008

(51) Int. Cl.
*B60N 2/22* (2006.01)
(52) U.S. Cl. .............................. 297/362.11; 297/361.1; 297/378.1; 297/378.12
(58) Field of Classification Search .............. 297/463.2, 297/354.1, 361.1, 378.1, 378.12, 354.12, 297/362, 362.11; 310/306, 307; 60/527, 60/528, 529; 337/333
See application file for complete search history.

(56) References Cited

U.S. PATENT DOCUMENTS

| | | | |
|---|---|---|---|
| 4,761,955 A * | 8/1988 | Bloch ............................. | 60/528 |
| 4,965,545 A * | 10/1990 | Johnson ........................ | 337/140 |
| 5,325,880 A | 7/1994 | Johnson et al. | |
| 5,536,069 A * | 7/1996 | Bray et al. ............... | 297/362.11 |
| 6,247,678 B1 | 6/2001 | Hines et al. | |
| 6,708,934 B2 * | 3/2004 | Brueske ........................ | 248/80 |
| 6,732,516 B2 * | 5/2004 | Butera et al. ................... | 60/527 |
| 6,742,761 B2 | 6/2004 | Johnson et al. | |
| 6,760,211 B2 * | 7/2004 | Bueno Ruiz et al. ........ | 361/160 |
| 6,840,257 B2 | 1/2005 | Dario et al. | |
| 6,851,260 B2 * | 2/2005 | Mernøe ........................ | 60/527 |
| 6,883,774 B2 | 4/2005 | Nielsen et al. | |
| 7,017,345 B2 * | 3/2006 | Von Behrens et al. ......... | 60/527 |
| 7,052,251 B2 | 5/2006 | Nason et al. | |
| 7,055,793 B2 | 6/2006 | Biehl et al. | |
| 7,547,070 B2 * | 6/2009 | Nathan et al. .......... | 297/378.12 |
| 7,556,315 B2 * | 7/2009 | Nathan et al. .......... | 297/378.12 |
| 2002/0145315 A1 * | 10/2002 | Fraley et al. ........... | 297/216.13 |
| 2003/0128491 A1 * | 7/2003 | Bueno Ruiz et al. ........ | 361/115 |
| 2003/0173863 A1 * | 9/2003 | Butera et al. ................ | 310/307 |

(Continued)

OTHER PUBLICATIONS

AFD China Intellectual Property Law Office, China Patent Office First Office Action for the corresponding Chinese Patent Application 200710195918.6 mailed Nov. 13, 2009.

*Primary Examiner*—Rodney B White
(74) *Attorney, Agent, or Firm*—Brooks Kushman P.C.

(57) ABSTRACT

An electronic trigger assembly for triggering an actuator, the electronic trigger assembly having a trigger member capable of connection to the actuator. The trigger member may be configured for rotation between a first position and a second position and the trigger member may be able to trigger the actuator as the trigger member rotates between the first position and the second position. The trigger member may also include a guide. A shape memory alloy member may be connected to the trigger member and may be received by the guide such that a substantial portion of the shape memory alloy member is disposed in a curvilinear arrangement. The shape memory alloy member may contract when electrified. The shape memory alloy member may be confined by the guide to contract along a path such that the shape memory alloy member exerts torque on the trigger member and causes the trigger member to rotate from the first position to the second position.

10 Claims, 4 Drawing Sheets

U.S. PATENT DOCUMENTS

| | | | |
|---|---|---|---|
| 2004/0068985 A1* | 4/2004 | Mernoe | 60/527 |
| 2005/0023086 A1* | 2/2005 | Szilagyi | 188/67 |
| 2005/0062329 A1* | 3/2005 | Alacqua et al. | 297/378.12 |
| 2005/0146147 A1 | 7/2005 | Niskanen et al. | |
| 2005/0150223 A1* | 7/2005 | Rey et al. | 60/527 |
| 2005/0178988 A1 | 8/2005 | Biehl et al. | |
| 2006/0013716 A1 | 1/2006 | Nason et al. | |
| 2006/0037315 A1* | 2/2006 | Zanella et al. | 60/527 |
| 2006/0138370 A1 | 6/2006 | Biehl et al. | |
| 2006/0172557 A1* | 8/2006 | He | 439/34 |
| 2006/0266031 A1* | 11/2006 | Kosaka et al. | 60/527 |
| 2007/0204613 A1* | 9/2007 | Alacqua et al. | 60/527 |
| 2008/0100118 A1* | 5/2008 | Young et al. | 297/404 |
| 2009/0236884 A1* | 9/2009 | Lawall et al. | 297/362 X |

* cited by examiner

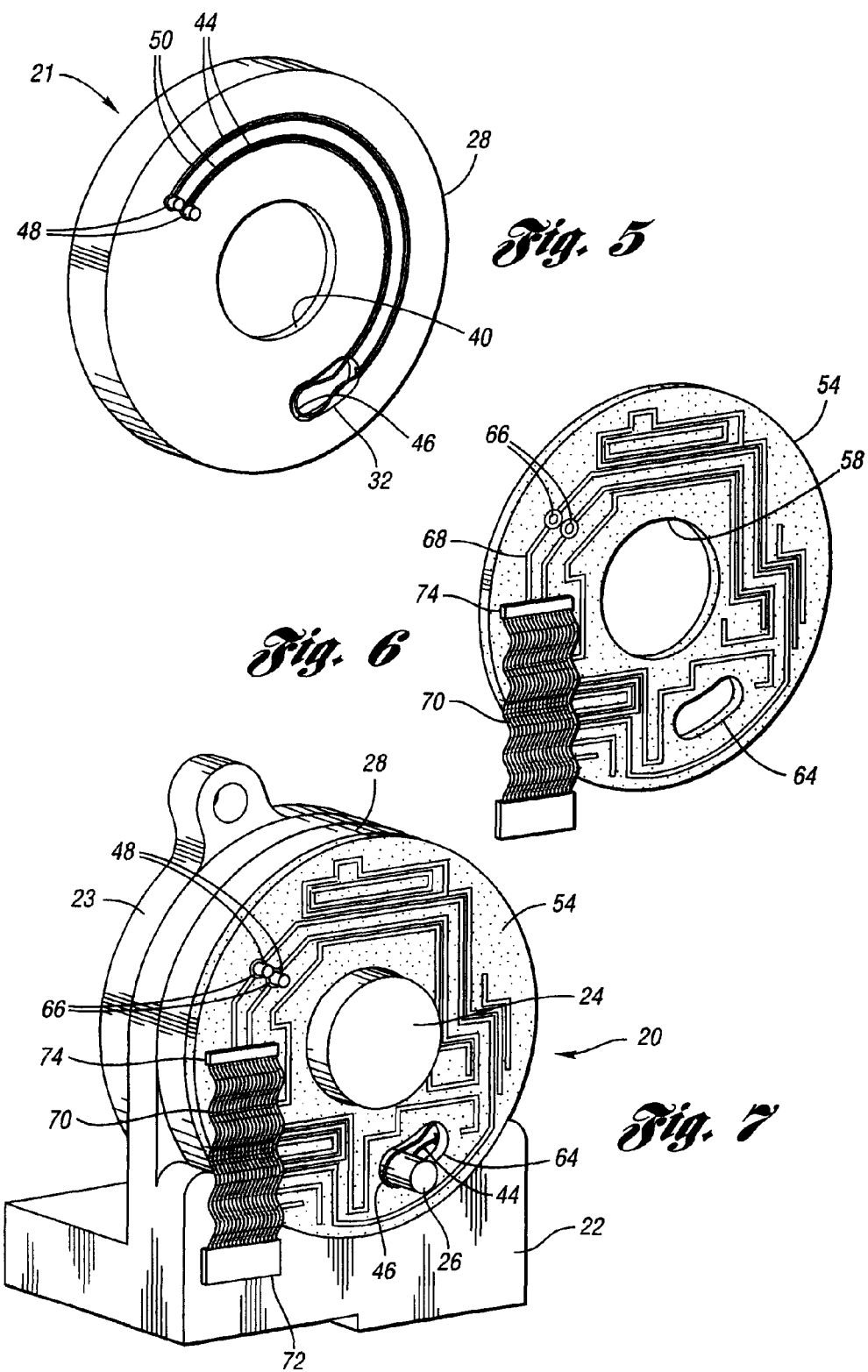

SMARTFOLD ELECTRONIC ACTUATION

BACKGROUND OF THE INVENTION

1. Field of the Invention

The present invention relates to remotely actuated vehicle seats.

2. Background Art

Latches are frequently used to secure a vehicle seat back in a particular orientation, such as an upright position, with respect to a seat bottom. When the latch is released, the seat back is free to rotate with respect to the seat bottom. In other applications, the seat back and the seat bottom may move with respect to one another in ways other than rotation, such as translation. Latches may be used to restrict this motion as well.

Actuators are devices that can trigger the operation of an apparatus. For instance, an actuator may be used to release a latch. Some actuators may be remotely triggered and, if coupled to a latch, may permit an operator to release the latch from a distance. When an actuator engages a latch on a vehicle seat, the actuator can trigger the motion of the seat. If the actuator is configured for remote operation, then the actuator can be triggered to release the latch and set the vehicle seat in motion from a distance. This is advantageous because it permits an operator to remotely fold, store or otherwise reconfigure seats inside a vehicle. For instance, an operator approaching the vehicle with arms full of cargo need only press a button, either on a remote control or mounted to a pillar and the seats can be reconfigured to receive the cargo.

Existing remotely actuated actuators require the use of relatively large, complicated motors that are bulky and that use a substantial amount of space. Reducing the size and complication of remotely operated triggering mechanisms could provide substantial space, weight and cost savings in the manufacture of a reconfigurable seat and, in particular, vehicle seats. These and other problems are addressed by the present invention.

SUMMARY OF THE INVENTION

Under the present invention, an electronic trigger assembly for triggering an actuator is provided. In at least one embodiment, the electronic trigger assembly has a trigger member capable of being connected to the actuator and configured for rotation between a first position and a second position. The trigger member may be capable of triggering the actuator as the trigger member rotates between the first position and the second position. The trigger member may also include a guide. A shape memory alloy member that contracts when electrified may be connected to the trigger member and may be received by the guide such that a substantial portion of the shape memory alloy member is disposed in a curvilinear arrangement. The shape memory alloy member may be confined by the guide to contract along a path such as the shape memory alloy member exerts force on the trigger member and causes the trigger member to rotate from the first position to the second position.

In at least another embodiment, an actuator assembly for use with an automotive seat assembly is provided. The actuator assembly may include an actuator that is configured for connection to the automotive seat assembly. The actuator may have a plurality of components configured for movement and a release mechanism for controlling said movement. The release mechanism may be configured for rotation between a hold position and a release position. A shape memory alloy member may be associated with the release mechanism. The shape memory alloy member contracts when electrified. The shape memory alloy member may be confined to contract along a path such that, when contracting, the shaped memory alloy member exerts a force that cause the release mechanism to rotate from the hold position to the release position.

In at least another embodiment, a seat assembly for use with an automotive vehicle is provided. The seat assembly may have a seat bottom, a seat back that is rotatably connected to the seat bottom, and a latch assembly that may be connected to the seat back. The latch assembly may be moveable between a locked position and a release position. The seat back may be inhibited from rotating where the latch assembly is in the locked position and the seat back may be free to rotate while the latch assembly is release position. The seat assembly further includes an actuator assembly that is associated with a latch assembly. The actuator assembly may have a plurality of components configured for movement, a release mechanism that may be configured for rotation between a hold position and a release position to control the movement of the plurality of components, and a shape memory alloy wire associated with the release mechanism. The shape memory alloy wire may contract in length when electrified and may be confined to contract along a path such as, when contracting, the shape memory alloy wire torques the release mechanism thereby causing the release mechanism to rotate from the hold position to the release position.

BRIEF DESCRIPTION OF THE DRAWINGS

FIG. 5 is a perspective view of an electronic trigger assembly that serves as a release mechanism for an actuator assembly;

FIG. 6 is a perspective view of an embodiment of a circuit plate for use with the electronic trigger assembly shown in FIG. 5;

FIG. 7 is a perspective view of an actuator assembly equipped with the electronic trigger assembly of FIG. 5 and the circuit plate of FIG. 6 in a first configuration;

DETAILED DESCRIPTION OF THE PREFERRED EMBODIMENT(S)

Figure 1:
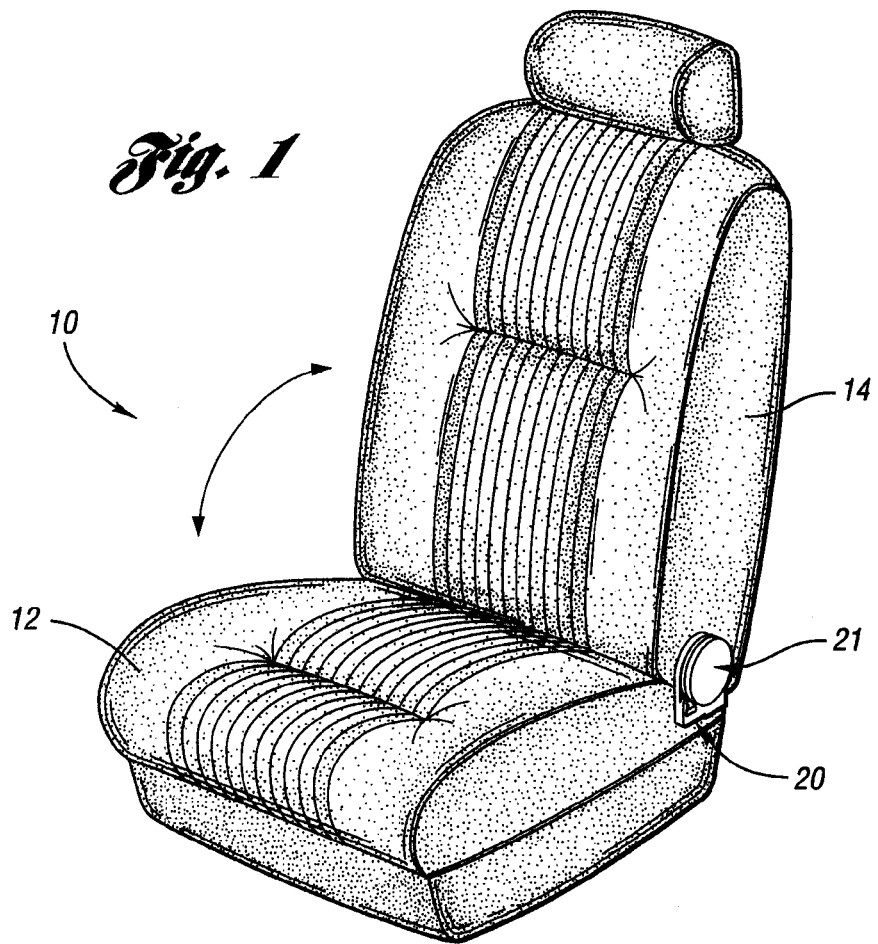
FIG. 1 is a perspective view of a vehicle seat assembly in an upright configuration.

Reference will now be made in detail to the illustrated embodiments of the present invention which constitute the best modes of practicing the invention presently known to the inventors. The following descriptions are merely exemplary in nature and in no way intended to limit the invention, its application, or uses. The figures are not necessarily drawn to scale. Specific details disclosed herein are not to be interpreted as limiting, but merely as a representative basis for any aspect of the invention and/or as a representative basis for teaching one skilled in the art to variously employ the present invention.

Shape memory alloys are materials that are known to contract when heated. Shape memory alloys return to their original shape after they have been heated to a temperature above a threshold temperature. Persons skilled in the art are aware of numerous metal alloys such as TiNiPd, TiNi, CuAl, CuZnAl, or CuAlNi, which have these properties. When shape memory alloy members, and in particular, shape memory alloy wires, are heated, such as by the flow of an electric current, these shape memory alloy wires contract in the longitudinal direction. In the process of contraction, the shape memory alloy wires can perform mechanical work, such as pulling against a spring to move an object biased by the spring in a direction opposite to the spring bias. Because shape memory alloy members may be drawn into wires, devices that perform mechanical work using shape memory alloy wires may be compact when compared with motors or other mechanical devices that perform the same or similar types of mechanical work. This is advantageous because it permits considerable space savings when compared with non-shape memory alloy wire devices.

At least one solution to the problems set forth in the background section above is an actuator assembly having an electronic trigger assembly that uses a shape memory alloy wire. The contraction of the shape memory alloy wire can rotate a release mechanism on the actuator assembly thus, actuating the actuator. At least one embodiment of the present invention can be used with an actuator assembly such as the one described in U.S. Pat. No. 7,547,070, filed on Jun. 21, 2006, the disclosure of which is incorporated herein by reference. An additional reference disclosing an actuator compatible with the present invention is contained in U.S. patent publication No. 2008/0111415, filed on Nov. 14, 2006, now abandoned, also incorporated herein by reference. The incorporation of these references is not intended to be limiting.

These referenced actuators each include a plurality of plates having pockets wherein ball bearings are retained. The plates are capable of rotation with respect to one another and each plate can have its rotation either obstructed or unobstructed depending upon the position of the ball bearings. One of the plates serves as a release mechanism to control the position of the ball bearings. When the release mechanism is in a hold position, the ball bearings obstruct movement of one of the other plates. When the release mechanism is moved to the release position, the ball bearings are permitted to move, thus freeing the other plate to rotate. This rotation may be driven by a spring and may be used to actuate a latch mechanism on a vehicle seat.

In at least 2 embodiments, an electronic trigger assembly made in accordance with the teachings of the present invention can be compatible with the actuator described above. In at least a first embodiment, the electronic trigger assembly can be connected to the actuator assembly's release mechanism and can cause it to move from the hold position to the release position. In at least a second embodiment, the electronic trigger assembly can be integrally incorporated into the release mechanism of the actuator.

With reference to FIG. 1, a vehicle seat assembly 10 is illustrated. Vehicle seat assembly 10 includes a seat bottom 12. The seat bottom 12 may be fixed to the floor of the vehicle such as train, plane, or automotive vehicle. In some embodiments, seat bottom 12 may be rigidly fixed to the floor of the vehicle. In other embodiments, seat bottom 12 may be hinged to permit storage. Examples of a storage configuration is where vehicle seat assembly 10 tumbles forward or folds flat into the floor of the vehicle.

Vehicle seat assembly 10 also includes seat back assembly 14. Seat back assembly 14 may be rotatably connected to seat bottom 12 and may be configured to fold over onto seat bottom 12. The folded configuration is useful when an operator wishes to store cargo or other items. In some embodiments, vehicle seat assembly 14 includes a spring or other biasing means urging seat assembly 14 to fold over onto seat bottom 12. The rotation of seat back assembly 14 may occur separately from, or in conjunction with the tumbling and/or folding flat of seat assembly 10.

Vehicle seat assembly 10 further includes latch assembly (not shown) attached to an outboard portion of seat back assembly 14. The latch assembly can be rotated between a locked position and an unlocked position. In other embodiments, the latch assembly may include a lever which pivots instead of rotating. In other embodiments, the latch assembly may include a button which moves between a depressed and non-depressed state. In the illustrated embodiment, when the latch assembly is rotated in a counterclockwise direction to the unlocked position, the latch assembly releases seat back assembly 14 to rotate with respect to seat bottom 12. If seat back assembly 14 is equipped with a biasing means, then when latch assembly 16 is rotated in the counterclockwise direction, seat back assembly will automatically fold forward onto the seat bottom 12. In embodiments lacking a biasing means, an operator may need to manually fold seat back assembly 14 onto seat bottom 12.

The vehicle seat assembly 10 illustrated in FIG. 1 has been equipped with an actuator assembly 20 and an electronic trigger assembly 21. Actuator assembly 20 is positioned over the latch assembly and is configured to engage and rotate the latch assembly from the locked position to the unlocked position which, in turn, releases seat back assembly 14 to rotate.

Figure 2:
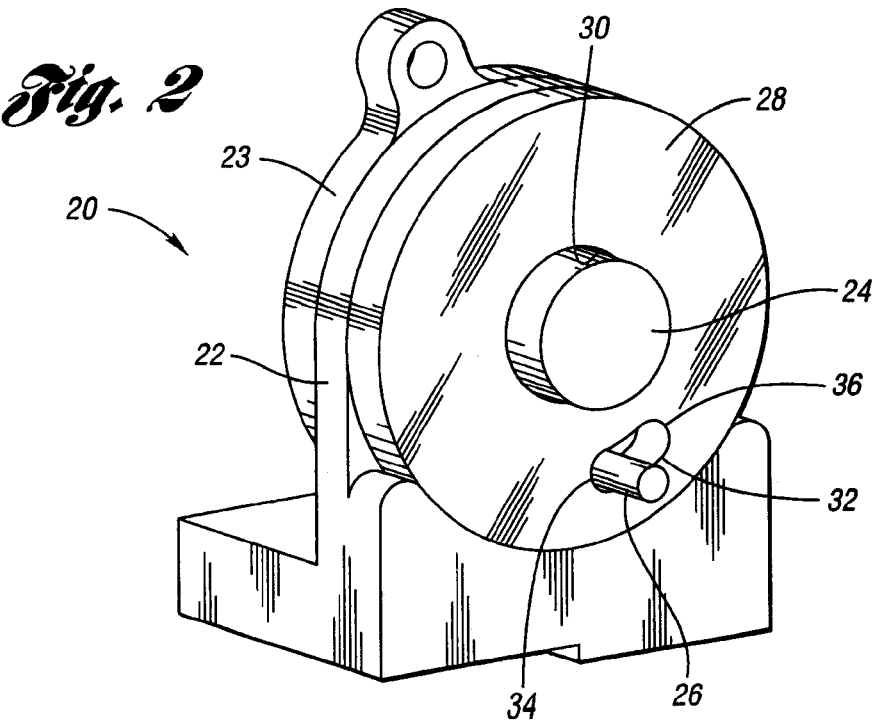
FIG. 2 is a perspective view of an embodiment of an actuator assembly for use with the vehicle seat of FIG. 1.

Actuator assembly 20, shown in FIG. 2, includes a reference plate 22, a power plate 23, a cylindrical member 24, a protrusion 26, and a release mechanism 28. Reference plate 22 serves as a platform on which other components of actuator assembly 20 may rotate. Reference plate 22 may be made of any material, but is preferably made from material comprising metal such as steel or aluminum. Reference plate 22 may be connected to seat assembly 14 through the use of threaded fasteners, rivets, or any other method of attachment effective to attach reference plate 22 to seat assembly 14. Reference plate 22 includes a cylindrical member 24 that projects in both an outboard and an inboard (not shown) direction. Cylindrical member 24 serves as an axis for rotation of other components of actuator assembly 20.

Power plate 23 is rotatably attached to actuator assembly 20 proximate to an inboard portion of reference plate 22 and is configured to rotate about the inboard portion of cylindrical member 24. Power plate 23 is further configured to engage the latch assembly. When actuator assembly 20 is triggered, the power plate 23 rotates in a counterclockwise direction (when viewed from FIG. 3) from a cocked position to a fired position, causing the latch assembly to rotate to the unlocked position. A detailed description of the interaction of the actuator's components is included in the incorporated disclosures of applications Ser. Nos. 11/472,203 and 11/559,531.

As illustrated, protrusion 26 is connected to reference plate 22 and projects in an outboard direction. In at least the illustrated embodiment, protrusion 26 is rigidly fixed to reference plate 22 and does not move relative to reference plate 22. Protrusion 26 serves as an anchor point about which the shape memory alloy member may be looped and against which the shape memory alloy member pulls (discussed below).

Cylindrical member 24 and protrusion 26 may be formed integrally with reference plate 22. Alternatively, cylindrical member 24 and protrusion 26 may be separately constructed and then attached to reference plate 22 in any manner effective to secure their connection to reference plate 22. In other embodiments, cylindrical member 24 may be integrally formed with other portions of the actuator assembly 20. In still other embodiments, cylindrical member 24 may be separately constructed and inserted through a central axis in actuator assembly 20.

Release mechanism 28 may be configured to rotate about cylindrical member 24. Release mechanism 28 includes a cylindrical member aperture 30 and a protrusion aperture 32. Release mechanism 28 may be retained on actuator assembly 20 through the use of a collar (not shown) disposed on cylindrical member 24 to prevent movement of release mechanism 28 in an outboard direction. Protrusion aperture 32 receives protrusion 26 when release mechanism 28 is attached to reference plate 22. Release mechanism 28 rotates with respect to reference plate 22 by cooperation of protrusion aperture 32 and protrusion 26. Rotation of release mechanism 28 is limited by the obstruction formed between the protrusion 26 and a first and second end 34, 36 of protrusion aperture 32. In the illustrated embodiment, protrusion aperture 32 provides a path for protrusion 26 as release mechanism 28 rotates about cylindrical member 24. In other embodiments, other structures may be provided to limit the rotation of release mechanism 28.

When release mechanism 28 is positioned with the first end 34 of protrusion aperture 32 proximate to protrusion 26, then release mechanism 28 is in the hold position. When release mechanism 28 is rotated in a clockwise direction (when viewed from the perspective of FIG. 2) to the point where the second end 36 of protrusion aperture 32 is proximate to protrusion 26, then the release mechanism 28 is in the release position and the power plate 23 is free to rotate.

Figure 3:
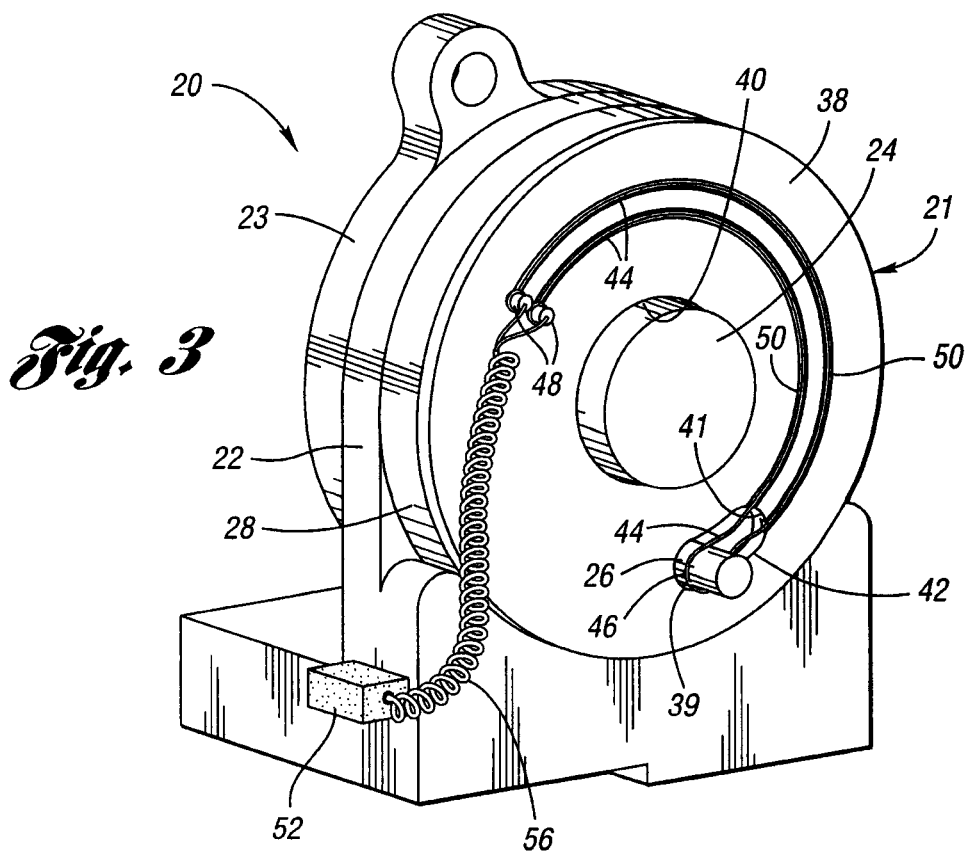
FIG. 3 is a perspective view of an embodiment of an electronic trigger assembly of the present invention connected to the actuator assembly of FIG. 2.

FIG. 3 illustrates at least one embodiment of the electronic trigger assembly 21 positioned on the actuator assembly 20 over release mechanism 28. The electronic trigger assembly 21 includes a trigger member or plate 38 having a cylindrical member aperture 40 and a protrusion aperture 42. In the illustrated embodiment, trigger member 38 is relatively thin when compared with release mechanism 28. In other embodiments, the relative thickness of the trigger member 38 and the release mechanism 28 may vary. Trigger member 38 is preferably made from a material that is substantially unable to conduct electricity including materials comprising ceramics or plastics. Preferably, trigger member 38 is made from a material comprising non electrically conductive plastics.

Trigger member 38 may be connected to release mechanism 28 through the use of threaded fasteners, adhesive means, or any other means effective to secure trigger member 38 to release mechanism 28. Rotation of trigger member 38 causes corresponding rotation of release mechanism 28. As illustrated, when trigger member 38 is connected to actuator assembly 20, cylindrical member 24 protrudes through cylindrical member aperture 40 and protrusion 26 protrudes through protrusion aperture 42. Trigger member 38 is thus configured to rotate about cylindrical member 24. This rotation is limited by the obstruction formed by protrusion 26 and protrusion aperture 42.

Electronic trigger assembly 21 further includes a shape memory alloy wire 44. In a preferred embodiment, the shape memory alloy wire 44 will be made from a material comprising nickel titanium and will have a thickness of approximately 0.020 inches. As illustrated, the shape memory alloy wire 44 is a single strand of wire that is folded over to form a loop 46 in the approximate middle of the shape memory alloy wire which is disposed around protrusion 26. In other embodiments, multiple shape memory alloy wires may be used. The ends of the shape memory alloy wire 44 are connected to trigger member 38 by pins 48. Preferably, pins 48 are electrically conductive. In other embodiments, shape memory alloy wire 44 may be fastened to the trigger member 38 by other means. Wires 56 are connected to pins 48 to provide a path for the transmission of an electric current from a power supply to the shape memory alloy wire 44.

Trigger member 38 includes a pair of grooves 50 defined in an outboard surface of trigger member 38. Shape memory alloy wire 44 is at least partially disposed within grooves 50. Grooves 50 serve as a guide to confine the shape memory alloy wire as it contracts, thereby controlling and directing the contraction of shape memory alloy wire 44 along a circular path. By contracting in this manner, shape memory alloy wire 44 is able to exert a torque force on the trigger member 38 through pins 48 when loop 46 is disposed around an object that remains stationary with respect to trigger member 38, such as protrusion 26. In the illustrated embodiment, grooves 50 are in the shape of arcs that are generally concentric with protrusion aperture 40. In other embodiments, only a single groove may be used. In still other embodiments, the grooves 50 may be in a shape other than that of an arc and may be oriented other than concentrically with protrusion aperture 40.

When electronic trigger assembly 21 is attached to release mechanism 28, loop 46 may be positioned at least partially around protrusion 26. In this configuration, when shape memory alloy wire 44 contracts, loop 46 pulls against protrusion 26. As the shape memory alloy wire 44 continues to contract, it tightens against the inner walls of groove 50 which serve to guide the contraction of shape memory alloy wire 44 and pulls on pins 48, causing trigger member 38 to rotate about cylindrical member 24.

A controller assembly 52 is attached to reference plate 22. Wires 56 connect pins 48 to controller 52. Controller 52 is configured for connection to power supply such as a vehicle battery. Controller 52 includes a circuit board (not shown) to facilitate the transmission of an electric current through wires 56 and through pins 48 to shape memory alloy wire 44. When an electric current is sent to controller 52 to electrify the shape memory alloy wire 44, controller 52 may be capable of determining certain environmental conditions such as whether the vehicle in which actuator assembly 20 is installed is in park or drive, whether the seat assembly 10 is in an upright or folded position or whether seat assembly 10 is occupied as indicated by a seat belt indicator. Controller 52 may also receive input from any other system within the vehicle that may be desirable to consider when determining whether to trigger the actuator assembly 20. Before the shape memory alloy wire beings to contract, the trigger member 38 is disposed in a first position wherein a first end 39 of protrusion aperture 42 is proximate to the protrusion 26. As shape memory alloy wire 44 contracts, loop 46 tightens and pulls on protrusion 26. As the contraction of shape memory alloy wire 44 occurs, trigger member 38 begins to rotate in a counterclockwise direction (when viewed from the perspective of FIG. 5). As trigger member 38 rotates, it causes the release mechanism 28 to rotate from the locked position to the unlocked position.

Figure 4:
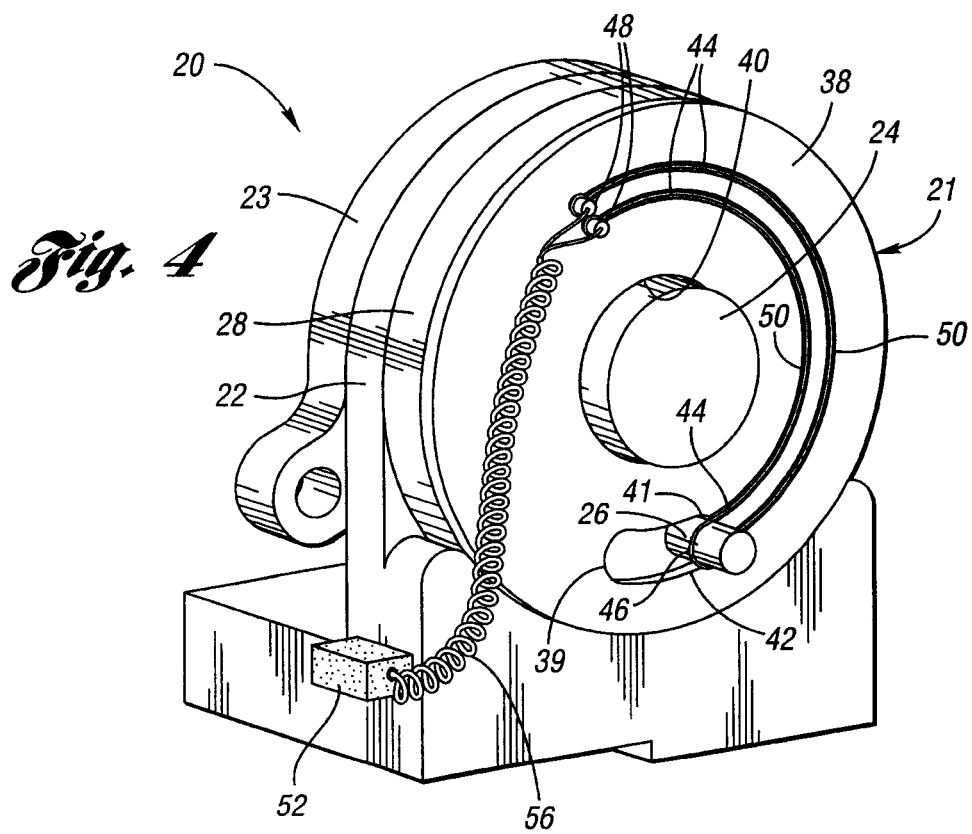
FIG. 4 is a perspective view of the electronic trigger assembly of FIG. 3 in an activated state.

FIG. 4 depicts the actuator assembly 20 after trigger member 38 has rotated to a second position wherein a second end 41 of the protrusion aperture 42 is proximate to the protrusion 26. The rotation of trigger member 38 to the second position has caused the release mechanism 28 to rotate from the hold position to the release position. When release mechanism 28 reaches the release position, ball bearings (not shown) disposed internally within the reference plate move into pockets disposed in the release mechanism 28, thus permitting power plate 23 to rotate. As shown in FIG. 4, power plate 23 has rotated in a counterclockwise direction.

FIG. 5 depicts at least a second embodiment of the electronic trigger assembly 21 wherein the trigger assembly and the release mechanism have been combined into a single, integral component. As illustrated, the thickness of release mechanism 28 has been increased and several of the features of electronic trigger assembly 21 have been incorporated into the release mechanism 28. Grooves 50 have been defined in the outboard surface of release mechanism 28 to accommodate the shape memory alloy wire 44. The pins 48 have been placed at one end of each groove 50 to secure the shape memory alloy wire 44 to the release mechanism 28. In a preferred embodiment, the pins 48 are electrically conductive. The shape memory alloy wire is secured to the pins 48, disposed within the grooves 50 and forms a loop 46 which extends into protrusion aperture 32. In a preferred embodiment, release mechanism 28 will be made of a material that is substantially unable to conduct electricity. By using a non-conductive material, the shape memory alloy wire 44 is insulated and the electric current does not discharge into release mechanism 28. In an alternative embodiment, the inboard portion of release mechanism 28 may be made of a metal material with a substantially non-conductive material such as plastic over-molded onto the outboard portion of release mechanism 28.

With reference to FIG. 6, a circuit plate 54 is depicted. In a preferred embodiment, circuit plate 54 is a circuit board having the same general shape and apertures as release mechanism 28 (as depicted in FIG. 5). As illustrated, the circuit plate 54 includes cylindrical member aperture 58 to allow circuit plate 54 to rotate about cylindrical member 24. Circuit plate 54 further includes protrusion aperture 64 at a location that corresponds to protrusion aperture 32 on release mechanism 28 to permit protrusion 26 to protrude through circuit plate 54 and thus permit the limited rotation of circuit plate 54 about cylindrical member 24.

Circuit plate 54 further includes pin receiving apertures 66 which receive pins 48 to effect the mounting of circuit plate 54 onto release mechanism 28 (of FIG. 5). Circuit plate 54 further includes traces 68 to perform logic functions and to provide an electrically conductive path to transmit an electric current through pin receiving aperture 66 to pins 48 for further transmission to the shape memory alloy wire 44. Circuit plate 54 further includes a wire assembly 70. Preferably, wire assembly 70 is a ribbon wire having a plurality of individual wires arranged in a substantially parallel position in a single plane. Wire assembly 70 is connectable to a power supply (not shown). When circuit plate 54 is mounted to release mechanism 28 and when wire assembly 70 is connected to a power supply, an electric current may be transmitted from the power supply to the shape memory alloy wire 44 along a path that includes wire assembly 70, traces 68 and pins 44. In a preferred embodiment, wire assembly 70 is flexible and, when connected to a power supply, will have slack sufficient to permit trigger mechanism 28 to rotate from the hold position to the release position without interference from wire assembly 70. Wire assembly 70 may be connected to circuit plate 54 at wire assembly mount 74 by soldering or through any other method effective to connect wire assembly 70 to circuit plate 54 so as to permit an electric current to pass between wire assembly 70 and traces 68.

FIG. 7 illustrates an actuator assembly 20 equipped with the release mechanism 28 of FIG. 5 and the circuit plate 54 of FIG. 6. As illustrated, wire assembly 70 is connected to a connector 72 mounted to reference plate 22. Connector 72 may be connected through wires or other attachments to a power supply (not shown). Pins 48 are depicted as protruding through pin receiving aperture 66. In other embodiments, pins 48 may rest flush with the outboard surface of circuit plate 54. In still other embodiments, pins 48 may be disposed below the outboard surface of circuit plate 54.

As illustrated in FIG. 7, release mechanism 28 and circuit plate 54 are in the first or hold position and power plate 23 is in the cocked position. As shown, wire assembly 70 has slack in its connection between the wire assembly connector 72 on reference plate 22 and the wire assembly mount 74 on reference plate 54.

Figure 8:
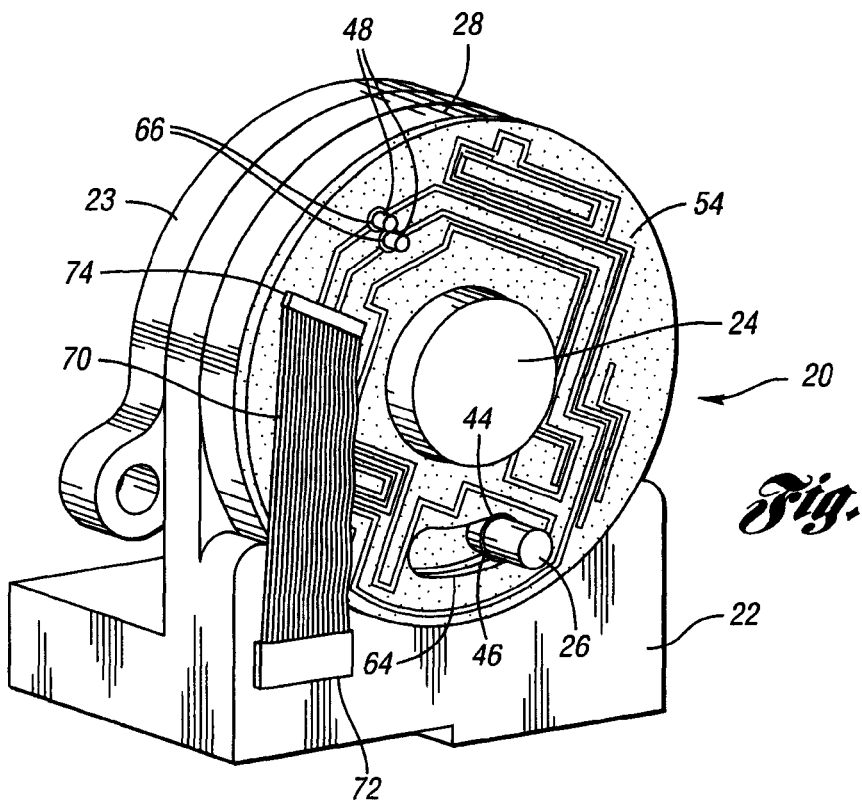
FIG. 8 is a perspective view of the assembly of FIG. 7 in a second configuration.

With reference to FIG. 8, actuator assembly 20 is depicted with the release mechanism 28 in the release position and the power plate 23 in the fired position. The rotation of the circuit plate 54 from the first position to the second position has consumed the slack in the wire assembly 70 which, as depicted in FIG. 8B is now taut. In other embodiments, wire assembly 70 may have a greater amount of slack such that when circuit plate 54 is in the second position, there remains some slack in wire assembly 70.

Figure 9:
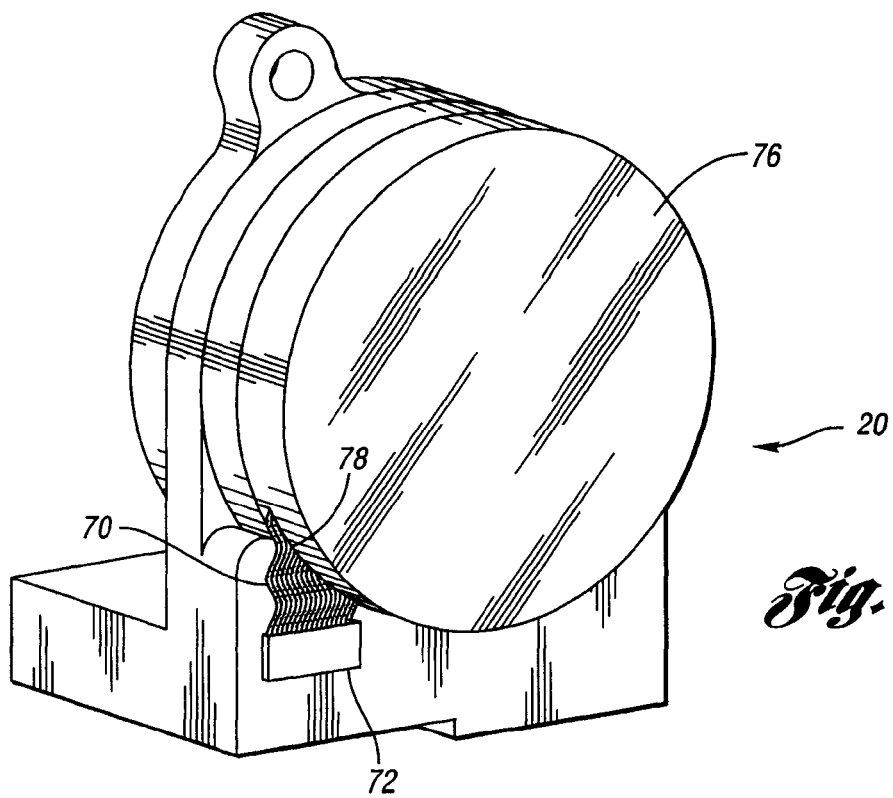
FIG. 9 is a perspective view illustrating the assembly of FIG. 7 equipped with a cover plate.

FIG. 9 depicts the actuator assembly 20 of FIG. 7 with a cover 76 over release mechanism 28 and circuit plate 54. An opening 78 is provided in cover 76 to accommodate wire assembly 70. In other embodiments, cover 76 may entirely cover wire assembly 70 and wire assembly connector 72. Cover 76 protects the circuit plate 54 and the release mechanism 28 and the various component thereof from dust, debris, impact and other elements which might be harmful to the long term operation of actuator assembly 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An actuator assembly comprising:
   a release mechanism having a slot;
   a reference plate having a protrusion that extends through the slot; and
   a shape memory alloy member disposed proximate the release mechanism and extending at least partially around the protrusion;
   wherein the shape memory alloy member engages and exerts a force against the protrusion to cause the protrusion to move within the slot and rotate the release mechanism when a sufficient electrical charge is provided.

2. The actuator assembly of claim 1 wherein the shape memory alloy member is disposed in a groove in the release mechanism.

3. The actuator assembly of claim 2 wherein at least a portion of the release mechanism is made from a material that is substantially non electrically conductive.

4. The actuator assembly of claim 2 wherein an arc of contraction of the shape memory alloy member is at least partially defined by the groove.

5. The actuator assembly of claim 4 wherein the groove defines an arc.

6. The actuator assembly of claim 1 further comprising an electrically conductive pin connected to the release mechanism wherein the shape memory alloy member is connected to the pin and wherein the shape memory alloy member exerts torque on the release mechanism through the pin.

7. The actuator assembly of claim 6 further comprising a circuit plate connected to the pin, the circuit plate being configured for connection to a power supply, the circuit plate being further configured to transmit an electric current from the power supply to the pin.

8. The actuator assembly of claim 7 further comprising a wire assembly connected to the circuit plate, the wire assembly being configured for connection to the power supply and the wire assembly having slack when connected to the power supply.

9. The actuator assembly of claim 1 wherein the shape memory alloy member is made from a material comprising nickel titanium.

10. The actuator assembly of claim 1 further comprising a trigger member connected to the release mechanism wherein the shape memory alloy member is connected to the trigger member, wherein the contraction of the shape memory alloy member exerts a torque on the trigger member and wherein the trigger member transmits the torque to the release mechanism.

* * * * *